United States Patent
Shigihara et al.

(10) Patent No.: US 7,804,398 B2
(45) Date of Patent: Sep. 28, 2010

(54) VALVE-INTEGRATED TRANSPONDER

(75) Inventors: Makoto Shigihara, Fukushima-ken (JP);
Takashi Sano, Fukushima-ken (JP);
Michiya Katou, Gifu-ken (JP)

(73) Assignees: Alps Electric Co., Ltd., Tokyo (JP);
Pacific Industrial Co., Ltd., Gifu-ken (JP)

( * ) Notice: Subject to any disclaimer, the term of this patent is extended or adjusted under 35 U.S.C. 154(b) by 321 days.

(21) Appl. No.: 12/133,699

(22) Filed: Jun. 5, 2008

(65) Prior Publication Data

US 2008/0303652 A1    Dec. 11, 2008

(30) Foreign Application Priority Data

Jun. 7, 2007    (JP) .............................. 2007-151640

(51) Int. Cl.
B60C 23/00    (2006.01)
(52) U.S. Cl. ..................... 340/447; 73/146.4; 73/146.5; 73/146.8; 116/34 R; 340/445; 343/711; 343/712
(58) Field of Classification Search ......... 340/442–447; 73/146.4–146.8; 343/711–712; 116/34 R; 152/152.1
See application file for complete search history.

(56) References Cited

U.S. PATENT DOCUMENTS 6,194,998 B1 * 2/2001 Huang ........................ 340/442
7,453,415 B2 * 11/2008 Shigihara et al. ............ 343/872
2006/0272402 A1 * 12/2006 Yin et al. .................... 73/146.8
2006/0273890 A1 * 12/2006 Kontogeorgakis et al. ... 340/445
2007/0103285 A1 * 5/2007 Konno et al. ................ 340/447

FOREIGN PATENT DOCUMENTS

JP    2006-069389    3/2006
JP    2008-011385 A    1/2008

* cited by examiner

*Primary Examiner*—Brent Swarthout
(74) *Attorney, Agent, or Firm*—Beyer Law Group LLP

(57) ABSTRACT

A valve-integrated transponder includes an air valve and a casing that are integrated with each other, and is disposed within a tire. The casing houses a substrate having a detecting element mounted thereon, an inverse F antenna element, and a supporting member. The antenna element has a substantially line symmetrical shape where a pair of radiation conductors extend away from each other. A longitudinal direction of the substrate is substantially perpendicular to an axial direction of the air valve, and a lateral direction of the substrate is inclined relative to a well of a wheel rim. The two radiation conductors of the antenna element disposed on the substrate are inclined at a predetermined angle with respect to the substrate, so as to be disposed substantially in parallel to the well that extends at the inner side of the transponder as viewed in the radial direction of the tire.

6 Claims, 5 Drawing Sheets

VALVE-INTEGRATED TRANSPONDER

CLAIM OF PRIORITY

This application claims benefit of the Japanese Patent Application No. 2007-151640 filed on Jun. 7, 2007, which is hereby incorporated by reference.

BACKGROUND OF THE INVENTION

1. Field of the Invention

The present invention relates to a valve-integrated transponder that is integrated with an air valve attached to a wheel rim and is disposed in a tire, and that is used in a system for monitoring the air pressure of the tire.

2. Description of the Related Art

In recent years, more and more vehicles are equipped with a system that enables a driver at the driver seat to monitor the air pressure of the tires. Specifically, such a system is provided for allowing a driver to quickly check the air pressure of the tires and to see whether the air pressure is abnormal while driving a vehicle, and is realized by installing transponders equipped with detecting elements and antenna elements in appropriate positions within the tires. A transponder of this type is integrally joined to, for example, an end of an air valve that is located within a tire, so that when the air valve is attached to a wheel rim, the valve-integrated transponder becomes disposed facing a well of the wheel rim. See Japanese Unexamined Patent Application Publication No. 2006-69389 (pages 3 to 5, and FIG. 1) for an example of such a valve-integrated transponder. Although the type of built-in antenna to be used in a transponder contained inside a tire is not particularly limited, an inverse F antenna element made by forming a metal plate is advantageous in terms of low fabrication cost and compactness.

A valve-integrated transponder of the related art normally contains a battery power source. However, with a structure equipped with a battery, the frequency of detecting the air pressure of a tire will need to be minimized to expand the life of the battery, and a complicated process will inevitably be necessary when replacing the battery. Recently, a valve-integrated transponder that does not require a battery power source has been proposed. Specifically, in this valve-integrated transponder, the antenna element inside the tire is excited by a radio wave sent from an external antenna in the vehicle body and is supplied with a signal current based on information detected by the detecting element. Such a valve-integrated transponder not requiring a battery can allow for an increase in the frequency of detecting the air pressure of the tire and can thus achieve higher detection accuracy. In addition, the valve-integrated transponder also allows for lower maintenance costs due to not requiring a battery replacement process.

Generally, a radio wave radiating from an antenna element of a valve-integrated transponder is transmitted to an external antenna in the vehicle body by passing through a side wall of a tire. If the radio wave used has a short wavelength and has a strong property of rectilinear propagation, such as a 2.4 GHz radio wave used in a transponder that does not require a battery, it is necessary to increase radiation components of a direct wave directed from the antenna element in the tire towards the side wall. However, with a common inverse F antenna element, a radio wave radiates both upward and sideward from a radiation conductor. This makes it difficult for the radio wave to radiate efficiently towards the side wall of the tire. If a common inverse F antenna element is contained in a valve-integrated transponder, and the antenna element is oriented such that the side wall is located next to the radiation conductor of the antenna element, the radiation conductor will be positioned near a wall surface of the wheel rim where a valve hole is located. This tends to cause an electric field to concentrate in a space between the radiation conductor and the wheel rim, which can cause the radiation components of a direct wave directed towards the side wall to become reduced.

SUMMARY OF THE INVENTION

The present invention provides a valve-integrated transponder that can allow a radio wave to radiate efficiently from a built-in antenna element towards a side wall of a tire.

The present invention provides a valve-integrated transponder that includes a detecting element that detects a condition inside a tire; a substrate on which the detecting element is mounted; an inverse F antenna element that outputs information detected by the detecting element to an outside; and a synthetic-resin casing that houses the detecting element, the substrate, and the antenna element. The casing is fitted to an end of an air valve attached to a wheel rim, the end of the air valve being located inside the tire, the casing being disposed at an outer side of a well of the wheel rim as viewed in a radial direction of the tire. The substrate is disposed within the casing such that a longitudinal direction of the substrate is substantially perpendicular to an axial direction of the air valve and that a lateral direction of the substrate is parallel to the axial direction. The antenna element is disposed on a surface of the substrate that is opposite to a surface thereof facing the well. A central section of the antenna element in a longitudinal direction thereof is provided with a feed terminal and a ground terminal, the antenna element having a substantially line symmetrical shape where a pair of radiation conductors extend symmetrically from the feed terminal and the ground terminal toward opposite longitudinal ends of the antenna element, the pair of radiation conductors being inclined with respect to the substrate so as to be disposed substantially in parallel to the well that extends at an inner side of the transponder as viewed in the radial direction of the tire.

With the inverted F antenna element contained in the valve-integrated transponder in this manner and having a substantially line symmetrical shape with the two radiation conductors extending symmetrically toward the opposite longitudinal ends of the antenna element from the central section thereof where the feed terminal and the ground terminal are provided, the radiation fields above the radiation conductors cancel each other out, thereby increasing the field intensity of radio waves radiating laterally from the radiation conductors. Moreover, since the two radiation conductors of the antenna element are disposed substantially in parallel to the well that extends at the inner side of the transponder as viewed in the radial direction of the tire, both radiation conductors are not disposed near a wall surface of the wheel rim where the valve hole is located. This weakens the electric field between the radiation conductors and the wheel rim, thereby relatively increasing the radiation components of a direct wave directed from the antenna element towards the side wall. Accordingly, in this valve-integrated transponder, even if the radio wave used has a short wavelength, the radio wave can radiate efficiently from the antenna element towards the side wall of the tire.

In the above configuration, the surface of the substrate that is opposite to the surface thereof facing the well preferably has disposed thereon a synthetic-resin supporting member that supports the antenna element, the supporting member having an inclined surface along which the pair of radiation conductors are disposed. This can advantageously prevent the antenna element from being deformed while the vehicle is running. In this case, it is preferable that the antenna element be made by forming a metal plate so that the manufacturing cost of the antenna element can be reduced.

Furthermore, in the above configuration, the antenna element may be integrally molded with the supporting member. This structure allows for better assembly efficiency for when the antenna unit is joined to the substrate by soldering. In addition, such a structure provides a fixed relationship between the antenna element and the supporting member, thereby allowing for less variation in the resonance frequency of the antenna. Even in a case where the antenna unit receives vibration and shock from the tire or the wheel rim, the antenna element is prevented from becoming detached from the supporting member, whereby stable performance can be maintained over a long period of time. In addition, the antenna element becomes highly resistant to corrosion due to being protected from moisture inside the tire.

Furthermore, in the above configuration, the opposite longitudinal ends of the antenna element may be provided with a pair of extension radiation conductors that are defined by bent extension end segments of the radiation conductors. Moreover, regions of the casing that face the pair of extension radiation conductors may be provided with a pair of beveled sections. In this manner, the dimension of the antenna element can be reduced in the longitudinal direction, thereby contributing to compactness of the transponder. In addition, the beveled sections of the casing can serve as escape sections to be used for when the tire is being attached to or detached from the wheel rim. This can reduce the risk of the tire or other tools accidentally coming into contact with the valve-integrated transponder.

Furthermore, in the above configuration, it is preferable that the antenna element of the valve-integrated transponder be excited by a radio wave from an external antenna attached to a vehicle body. Consequently, the valve-integrated transponder can allow for an increase in the frequency of detecting the air pressure of the tire and can thus achieve higher detection accuracy. In addition, the valve-integrated transponder also allows for lower maintenance costs due to not requiring a battery replacement process.

DESCRIPTION OF THE PREFERRED EMBODIMENTS

Figure 1:
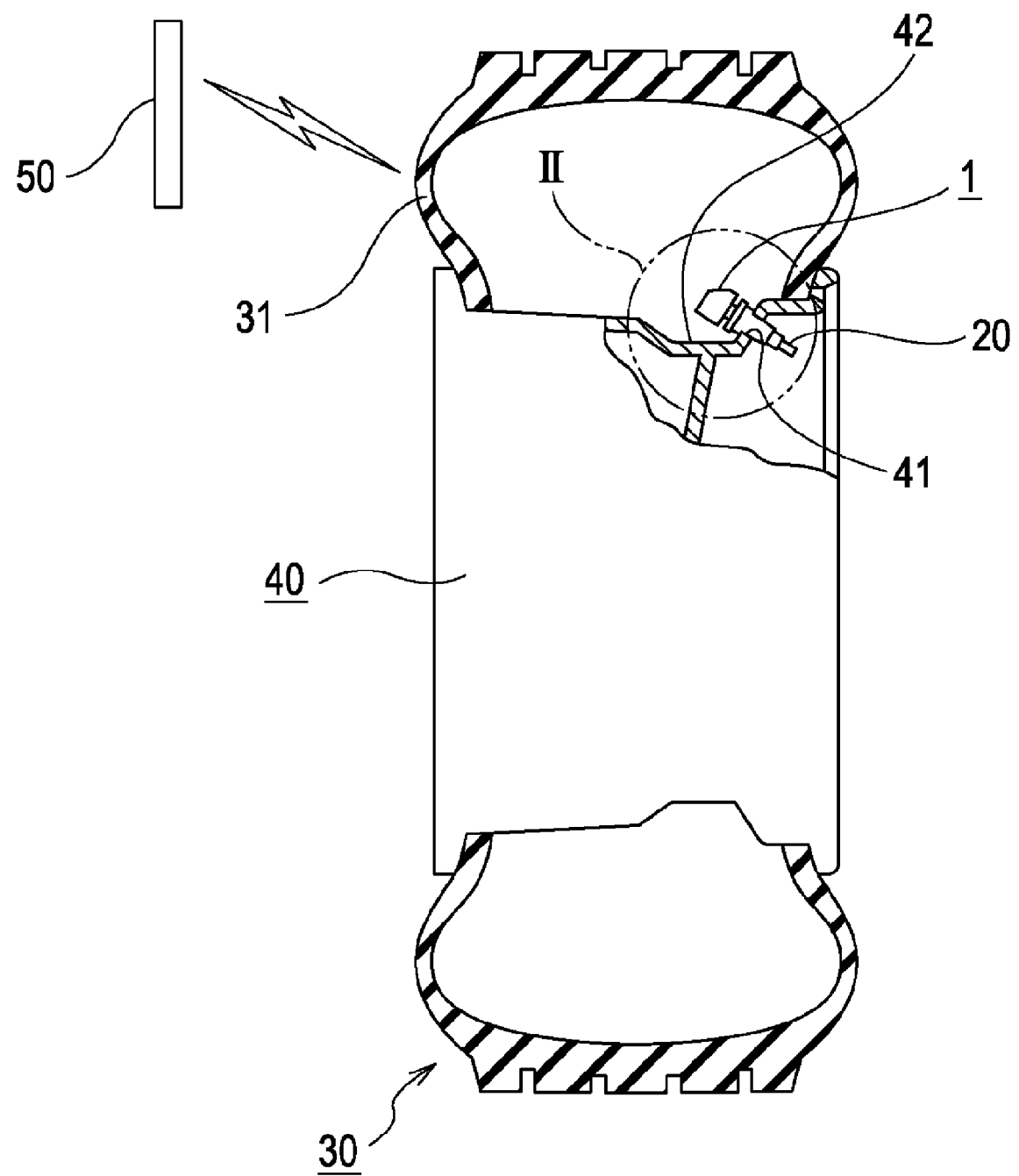
FIG. 1 illustrates a mounting position of a valve-integrated transponder according to a first embodiment of the present invention inside a tire.
Figure 2:
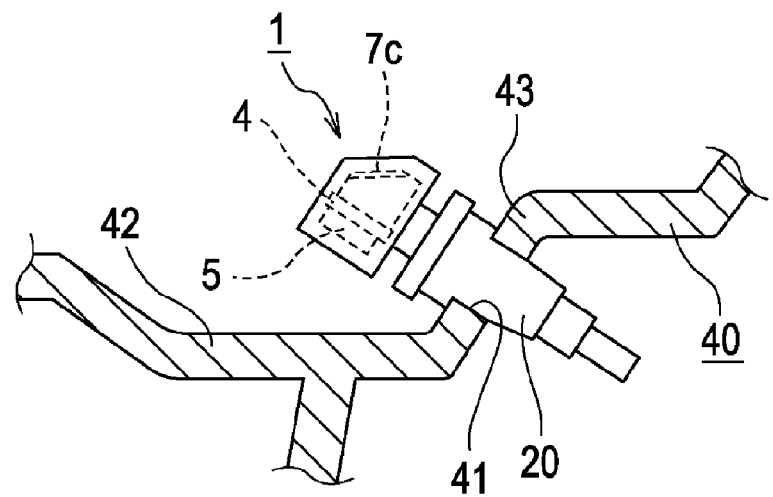
FIG. 2 is an enlarged view of region II in FIG. 1.
Figure 3:
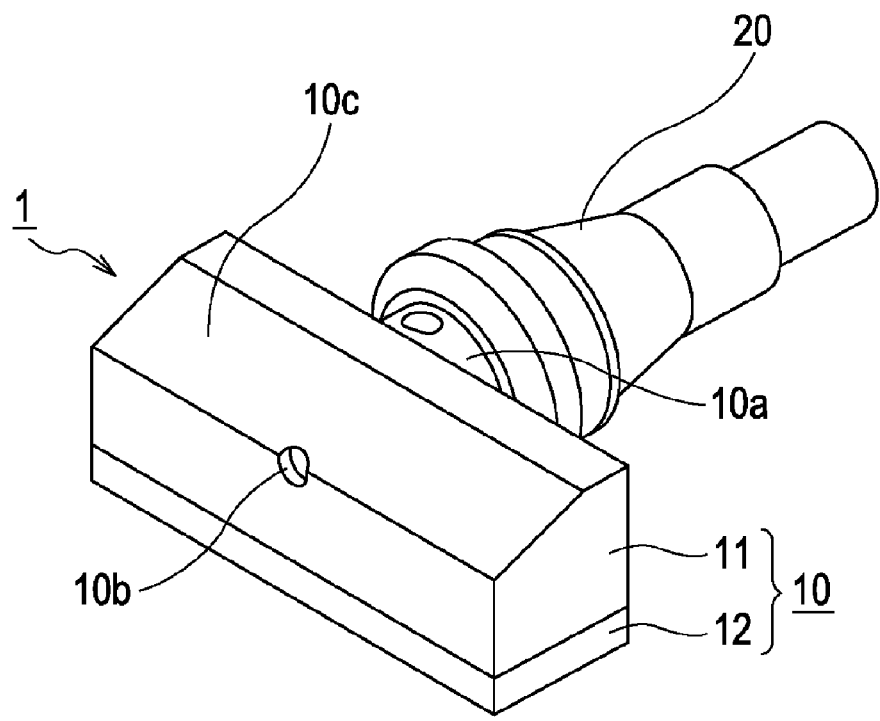
FIG. 3 is an external view of an air valve fitted with the transponder shown in FIG. 2.
Figure 4:
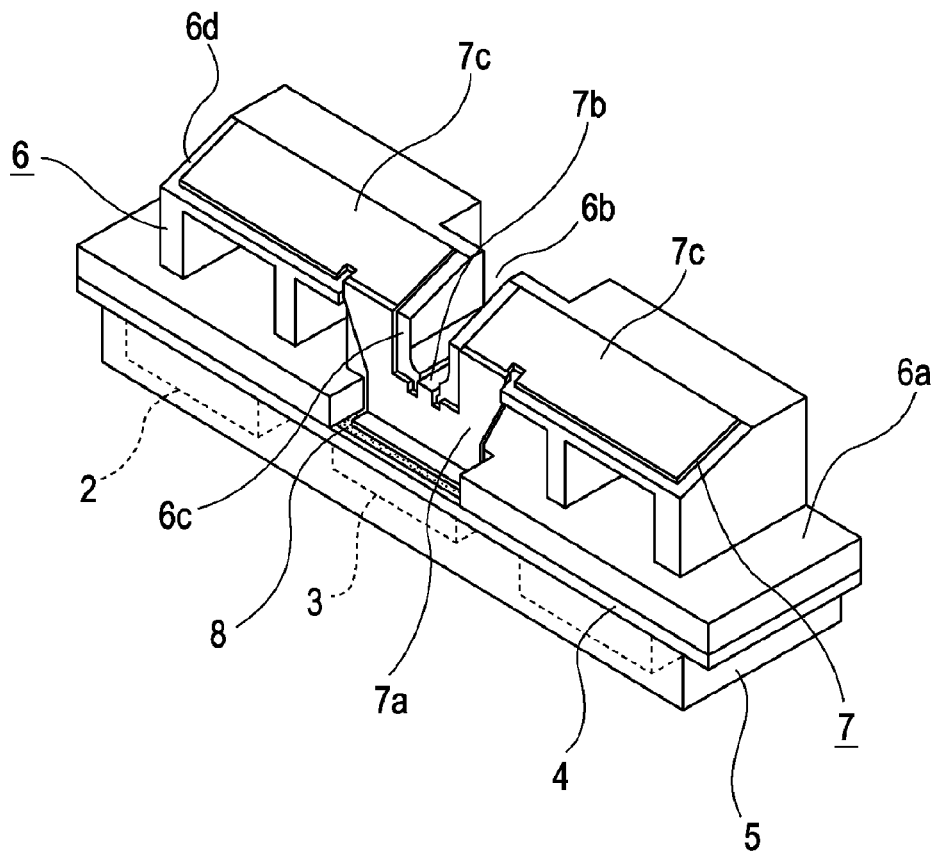
FIG. 4 illustrates the internal structure of the transponder according to the first embodiment as viewed from an external-antenna side.
Figure 5:
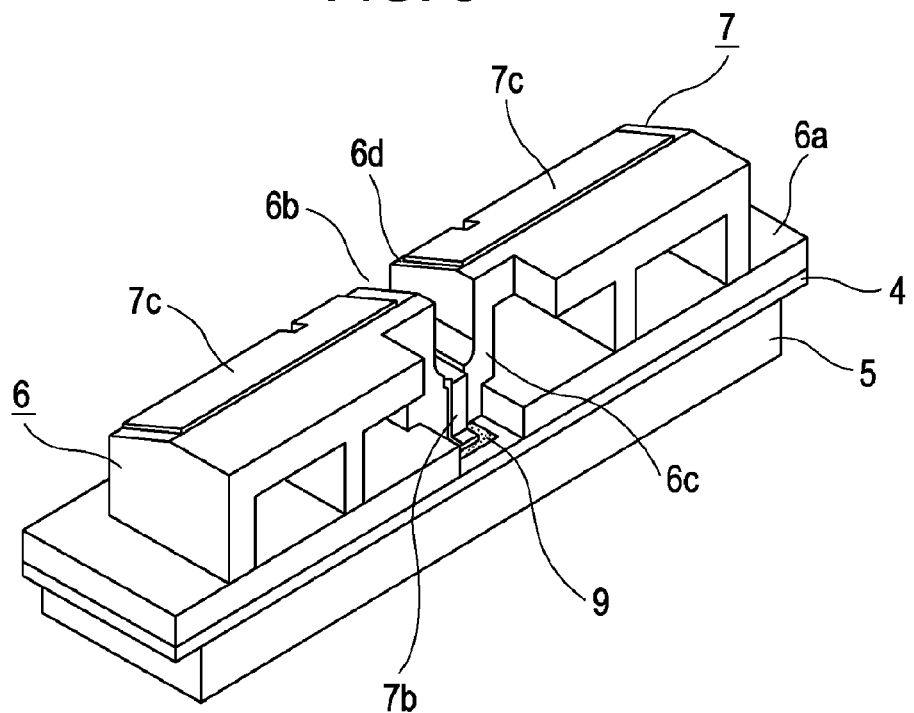
FIG. 5 illustrates the internal structure of the transponder according to the first embodiment as viewed from an air-valve side.

Embodiments of the present invention will now be described with reference to the drawings. FIG. 1 illustrates a mounting position of a valve-integrated transponder according to a first embodiment of the present invention inside a tire. FIG. 2 is an enlarged view of region II in FIG. 1. FIG. 3 is an external view of an air valve fitted with the transponder. FIG. 4 illustrates the internal structure of the transponder as viewed from an external-antenna side. FIG. 5 illustrates the internal structure of the transponder as viewed from an air-valve side.

A valve-integrated transponder 1 shown in these drawings is fitted to one end of an air valve 20 and disposed within a tire 30, and is for enabling a driver at the driver seat to monitor the air pressure and temperature inside the tire 30. The transponder 1 has a synthetic-resin casing 10 that houses a detection circuit unit 2 having detecting elements such as a pressure sensor and a temperature sensor, a transmitter/receiver circuit unit 3, a substrate 4 having these circuit units 2 and 3 mounted on a first surface thereof, a shield cover 5 formed of sheet metal that covers both the circuit units 2 and 3, a synthetic-resin supporting member 6 disposed on a second surface of the substrate 4, and an inverse F antenna element 7 that is supported by the supporting member 6 and electrically connected to the transmitter/receiver circuit unit 3. The transponder 1 does not contain a battery power source. Instead, the transponder 1 is configured such that the antenna element 7 is excited by a radio wave from an external antenna 50 (see FIG. 1) provided in the vehicle body. Referring to FIGS. 1 and 2, the air valve 20 is securely press-fitted in a valve hole 41 of a wheel rim 40, and the casing 10 is attached to an end portion of the air valve 20 that is located within the tire 30. Consequently, the transponder 1 is disposed within the tire 30 at an outer side of a well 42 of the wheel rim 40 as viewed in the radial direction of the tire 30.

The casing 10 is a housing that is formed by joining together a casing body 11 and a lid body 12. A first side surface of the casing body 11 has a central section in the longitudinal direction thereof, from which a connector portion 10a engageable to the air valve 20 extends. On the other hand, a second side surface of the casing body 11 has a central section in the longitudinal direction thereof, which is provided with an air hole 10b that takes in the air in the tire 30. A region of the casing body 11 that faces radiation conductors 7c of the antenna element 7 is an inclined portion 10c.

The detection circuit unit 2 has the detecting elements such as the pressure sensor and the temperature sensor for detecting the pressure and temperature of the air in the tire 30 that is introduced into the casing 10 through the air hole 10b. The transmitter/receiver circuit unit 3 receives an inquiry signal sent from the external antenna 50 in the vehicle body to the antenna element 7, and also receives a signal (detection signal) based on the detected information from the detection circuit unit 2. The transmitter/receiver circuit unit 3 processes this detection signal and outputs the processed signal to the antenna element 7. The detection circuit unit 2 and the transmitter/receiver circuit unit 3 are mounted on one surface of the substrate 4 (i.e. a first main surface of the substrate 4 that faces the well 42) while being covered with the shield cover 5. Accordingly, the detection circuit unit 2 and the transmitter/receiver circuit unit 3 are electromagnetically shielded by the shield cover 5 and are therefore hardly susceptible to external noise. The external antenna 50 is installed in a tire house (not shown) of the vehicle body that faces a side wall 31 of the tire 30.

The substrate 4 is disposed within the casing 10 in a manner such that the longitudinal direction thereof is substantially perpendicular to the axial direction of the air valve 20 and that the lateral direction thereof is parallel to the axial direction (see FIG. 2). In other words, inside the tire 30, the lateral direction of the substrate 4 is inclined at a predetermined angle with respect to the well 42 that extends at the inner side of the transponder 1 as viewed in the radial direction of the tire 30. Referring to FIGS. 4 and 5, a second main surface of the substrate 4 opposite to the first main surface thereof facing the well 42 is provided with a ground electrode 8 and a feed electrode 9, and holds thereon the supporting member 6. This supporting member 6 supports the antenna element 7.

The supporting member 6 includes a flat base portion 6a securely attached on the substrate 4 and a central erected portion 6c extending upright from a central region of the base portion 6a and defining the contour of a recessed slot 6b. The top surface of the supporting member 6 has a pair of inclined portions 6d that are inclined at a predetermined angle with respect to the substrate 4 and extend in the longitudinal direction of the supporting member 6. The two inclined portions 6d have an open end of the recessed slot 6b located therebetween.

The antenna element 7 is made by forming a metal plate, but has a significantly different shape to that of a common inverse F antenna element. The antenna element 7 is formed into a substantially line symmetrical shape and has radiation conductors 7c symmetrically extending toward opposite longitudinal ends of the antenna element 7 from a central section in the longitudinal direction thereof where a ground terminal 7a and a feed terminal 7b are disposed. The radiation conductors 7c are securely attached on the inclined portions 6d of the supporting member 6. In other words, the pair of radiation conductors 7c of the antenna element 7 extend longitudinally while being inclined at a predetermined angle with respect to the substrate 4. Consequently, as shown in FIG. 2, inside the tire 30, the radiation conductors 7c are disposed substantially in parallel to the well 42 that extends at the inner side (the lower side in FIG. 2) of the transponder 1 as viewed in the radial direction of the tire 30. Since the antenna element 7 has a substantially line symmetrical shape with the pair of radiation conductors 7c extending away from each other from the central section, the radiation fields above the radiation conductors 7c cancel each other out, thereby increasing the field intensity of radio waves radiating laterally from the radiation conductors 7c. Referring to FIG. 4, the ground terminal 7a of the antenna element 7 is disposed along a first side surface of the central erected portion 6c of the supporting member 6 and is soldered to the ground electrode 8. On the other hand, referring to FIG. 5, the feed terminal 7b is extended along an inner bottom surface of the recessed slot 6b to a second side surface of the central erected portion 6c and is soldered to the feed electrode 9. For transmission and reception of signals between the antenna element 7 and the external antenna 50 in the vehicle body, 2.4 GHz radio waves are used. Therefore, a radio wave sent from the antenna element 7 to the external antenna 50 as a response signal is mainly a direct wave directed from the antenna element 7 towards the side wall 31 of the tire 30.

When such a valve-integrated transponder 1 fitted to the air valve 20 and disposed within the tire 30 receives a radio wave as an inquiry signal from the external antenna 50 in the vehicle body, the antenna element 7 is excited and thus generates a high-frequency current. Then, the information about the air pressure and the temperature in the tire 30 detected by the pressure sensor and the temperature sensor is superposed on this high-frequency current, and the signal current (detection signal) is sent from the detection circuit unit 2 to the transmitter/receiver circuit unit 3. The transmitter/receiver circuit unit 3 processes this detection signal and outputs the processed signal to the antenna element 7. Thus, the antenna element 7 sends a radio wave as a response signal to the external antenna 50.

As described above, in the first embodiment, the inverse F antenna element 7 contained in the valve-integrated transponder 1 has a substantially line symmetrical shape with the radiation conductors 7c extending symmetrically toward the opposite longitudinal ends of the antenna element 7 from the central section in the longitudinal direction thereof where the ground terminal 7a and the feed terminal 7b are disposed. Consequently, the radiation fields above the radiation conductors 7c cancel each other out, whereby the field intensity of radio waves radiating laterally from the radiation conductors 7c is increased. This allows for efficient radiation of radio waves from the antenna element 7 towards the side wall 31 of the tire 30.

Moreover, in the valve-integrated transponder 1, the two radiation conductors 7c of the antenna element 7 are disposed substantially in parallel to the well 42 that extends at the inner side of the transponder 1 as viewed in the radial direction of the tire 30. Therefore, both radiation conductors 7c are not disposed near a wall surface 43 (see FIG. 2) of the wheel rim 40 where the valve hole 41 is located. This weakens the electric field between the radiation conductors 7c and the wheel rim 40, thereby further increasing the field intensity of radio wave radiating from the antenna element 7 towards the side wall 31. In other words, the valve-integrated transponder 1 is designed to increase the radiation components of a direct wave directed from the antenna element 7 towards the side wall 31. Accordingly, a radio wave as a response signal can be reliably sent to the external antenna 50 in the vehicle body.

Furthermore, the valve-integrated transponder 1 does not have a battery power source, and is configured such that the antenna element 7 is excited by a radio wave from the external antenna 50 attached to the vehicle body. This configuration allows for an increase in the detection frequency as well as lower maintenance costs. The antenna element 7 can be fabricated at low cost by forming a metal plate. Furthermore, since the antenna element 7 is supported by the supporting member 6, the antenna element 7 is highly resistant to deformation.

Figure 6:
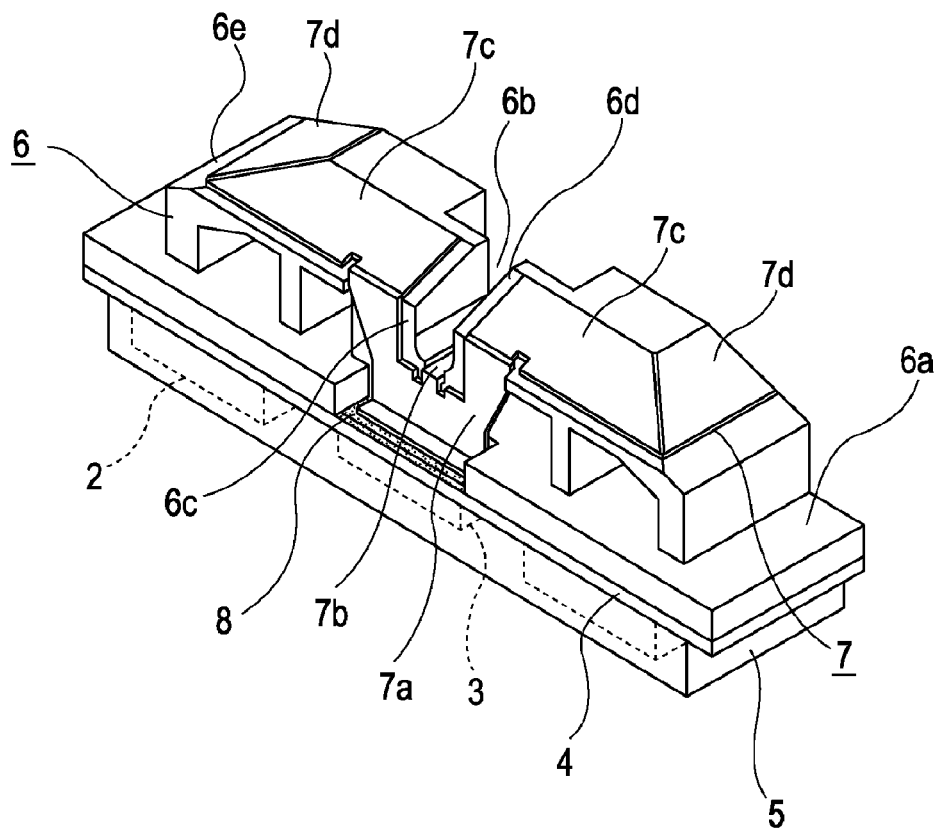
FIG. 6 illustrates the internal structure of a valve-integrated transponder according to a second embodiment of the present invention.
Figure 7:
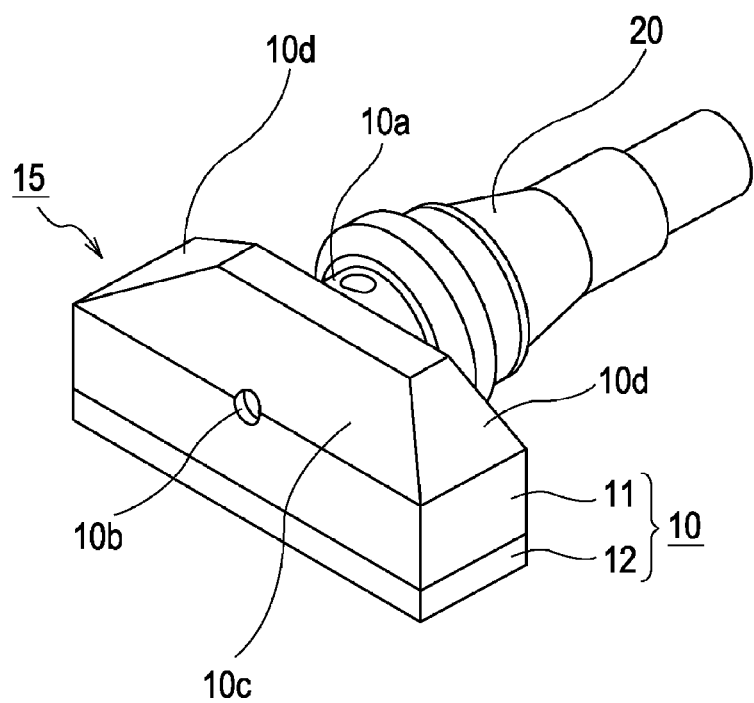
FIG. 7 is an external view of the transponder according to the second embodiment and the air valve.

FIG. 6 illustrates the internal structure of a valve-integrated transponder according to a second embodiment of the present invention. FIG. 7 is an external view of the transponder and the air valve. The components shown in FIGS. 6 and 7 that correspond to those in FIGS. 3 and 4 are indicated with the same reference numerals, and descriptions of those components will not be repeated.

The second embodiment differs from the first embodiment in the configurations of the antenna element 7, the supporting member 6, and the longitudinal end sections of the casing 10. Specifically, in a valve-integrated transponder 15 shown in FIGS. 6 and 7, the longitudinal end sections of the antenna element 7 are provided with extension radiation conductors 7d, which are defined by bent extension end segments of the radiation conductors 7c. The pair of extension radiation conductors 7d are securely attached to a pair of inclined side surfaces 6e of the supporting member 6, respectively. In the transponder 15, regions of the casing body 11 of the casing 10 that face the two extension radiation conductors 7d of the antenna element 7 are provided with a pair of beveled sections 10d. Providing the extension radiation conductors 7d at the longitudinal end sections of the antenna element 7 in this manner can reduce the dimension of the antenna element 7 in the longitudinal direction, thereby contributing to compactness of the transponder 15. In addition, with the longitudinal end regions of the casing 10 being provided with the beveled sections 10d in conformity to the extension radiation conductors 7d, the beveled sections 10d can serve as escape sections to be used for when the tire 30 is being attached to or detached from the wheel rim 40. This reduces the risk of the tire 30 or other tools accidentally coming into contact with the valve-integrated transponder 15.

Figure 8:
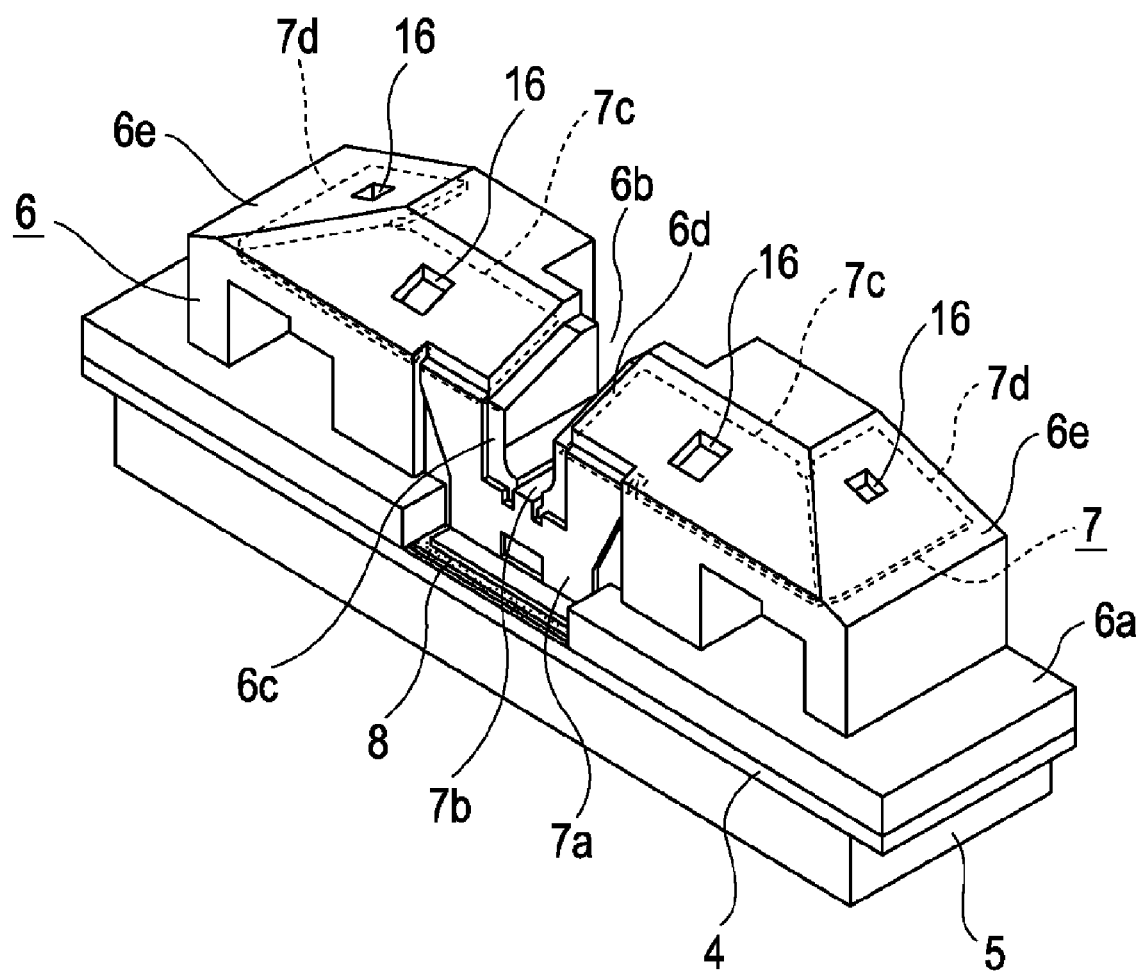
FIG. 8 illustrates the internal structure of a valve-integrated transponder according to a third embodiment of the present invention.

FIG. 8 illustrates the internal structure of a valve-integrated transponder according to a third embodiment of the present invention. The components shown in FIG. 8 that correspond to those in FIG. 6 are indicated with the same reference numerals, and descriptions of those components will not be repeated.

The third embodiment differs from the first and second embodiments in that the antenna element 7 is integrally molded with the synthetic-resin supporting member 6. Specifically, in a valve-integrated transponder shown in FIG. 8, the radiation conductors 7c and the extension radiation conductors 7d of the antenna element 7 are embedded in the inclined portions 6d and the inclined side surfaces 6e of the supporting member 6 by insert molding, whereas the ground terminal 7a and the feed terminal 7b are exposed along the outer surface of the supporting member 6. Reference numeral 16 in FIG. 8 denotes positioning holes. These positioning holes 16 are formed by pressing positioning pins against the antenna element 7 at the time of the molding process. This structure in which the antenna element 7 is integrally molded with the supporting member 6 allows for better assembly efficiency for when the antenna unit is joined to the substrate 4 by soldering. In addition, such a structure provides a fixed relationship between the antenna element 7 and the supporting member 6, thereby allowing for less variation in the resonance frequency of the antenna. Even in a case where the antenna unit receives vibration and shock from the tire or the wheel rim, the antenna element 7 is prevented from becoming detached from the supporting member 6, whereby stable performance can be maintained over a long period of time. In addition, the antenna element 7 is highly resistant to corrosion due to being protected from moisture inside the tire. As a result, stable performance can be maintained over a long period of time.

In the above embodiments, the ground terminal 7a of the antenna element 7 is disposed along the first side surface of the supporting member 6, and the feed terminal 7b extends from the first side surface to the second side surface of the supporting member 6 through the recessed slot 6b. Alternatively, the feed terminal 7b may be disposed along the second side surface of the supporting member 6 without being extended through the recessed slot 6b.

Although the air valve described in the above embodiments is of a snap-in type that is press-fitted to a valve hole of a wheel rim, the present invention may alternatively be applied to an air valve of a clamp-in type that is screwed onto a wheel rim.

What is claimed is:

1. A valve-integrated transponder comprising:
a detecting element that detects a condition inside a tire;
a substrate on which the detecting element is mounted;
an inverse F antenna element that outputs information detected by the detecting element to an outside; and
a synthetic-resin casing that houses the detecting element, the substrate, and the antenna element, the casing being fitted to an end of an air valve attached to a wheel rim, the end of the air valve being located inside the tire, the casing being disposed at an outer side of a well of the wheel rim as viewed in a radial direction of the tire,
wherein the substrate is disposed within the casing such that a longitudinal direction of the substrate is substantially perpendicular to an axial direction of the air valve and that a lateral direction of the substrate is parallel to the axial direction, and
wherein the antenna element is disposed on a surface of the substrate that is opposite to a surface thereof facing the well, and wherein a central section of the antenna element in a longitudinal direction thereof is provided with a feed terminal and a ground terminal, the antenna element having a substantially line symmetrical shape where a pair of radiation conductors extend symmetrically from the feed terminal and the ground terminal toward opposite longitudinal ends of the antenna element, the pair of radiation conductors being inclined with respect to the substrate so as to be disposed substantially in parallel to the well that extends at an inner side of the transponder as viewed in the radial direction of the tire.

2. The valve-integrated transponder according to claim 1, wherein the surface of the substrate that is opposite to the surface thereof facing the well has disposed thereon a synthetic-resin supporting member that supports the antenna element, the supporting member having an inclined surface along which the pair of radiation conductors are disposed.

3. The valve-integrated transponder according to claim 2, wherein the antenna element is made by forming a metal plate.

4. The valve-integrated transponder according to claim 2, wherein the antenna element is integrally molded with the supporting member.

5. The valve-integrated transponder according to claim 1, wherein the opposite longitudinal ends of the antenna element are provided with a pair of extension radiation conductors that are defined by bent extension end segments of the radiation conductors, and
wherein regions of the casing that face the pair of extension radiation conductors are provided with a pair of beveled sections.

6. The valve-integrated transponder according to claim 1, wherein the antenna element is excited by a radio wave from an external antenna attached to a vehicle body.

* * * * *